United States Patent Office 3,445,291

Patented May 20, 1969

3,445,291
THERMAL BATTERY WITH TEMPERATURE INDICATING POTTING COMPOSITION

Leonard A. Stein, Baltimore, Md., assignor to Catalyst Research Corporation, Baltimore, Md., a corporation of Maryland No Drawing. Filed July 14, 1966, Ser. No. 565,078
Int. Cl. H01m *31/04*
U.S. Cl. 136—83 1 Claim

ABSTRACT OF THE DISCLOSURE

A transparent potting composition that changes color at elevated temperatures has between about 0.5 and 1.5% of an inert salt that changes color at the elevated temperature dispersed in a transparent synthetic resin. Thermal batteries are encapsulated in the potting compositions and the color of the potting composition indicates whether the battery has been used.

This invention relates to transparent potting compositions that change color when exposed to increases in temperature.

In potting electrical components, such as circuit boards and the like, it is frequently desirable to use transparent potting compounds so that the potted article may be inspected. In many instances, failure of components is accompanied by evolution of heat and it is desirable to be able to determine by quick visual inspection whether a component has failed, or in complex circuits, which component has failed.

The transparent potting compositions of this invention are particularly useful in potting heat activated batteries, commonly known as thermal batteries. Such batteries have found wide use because of their long shelf life, ruggedness, quick activation, miniaturization and a wide range of electrical capabilities, and are described in detail by C. A. Hempel, Encyclopedia of Electrochemistry, Reinhold Publishing Co., 1964. Since there is no outward change in appearance between used and unused batteries, it is desirable to have a readily observable indication to show whether a battery has been activated by heating and used. Identification markings are normally placed on the thermal battery housing and it is necessary that the indicator showing the battery has been used does not obscure these markings.

It is therefore an object of this invention to provide a transparent potting composition that changes color when heated. Another object is to provide a thermal battery having a colorimetric indicator showing whether the battery has been used. Other objects will be apparent from the following description and claim.

According to this invention, less than about 1½%, preferably between about 0.5 to 1.0%, of a finely divided inorganic salt that changes color when heated above a predetermined temperature is dispersed in a transparent synthetic potting resin that is curable at a temperature below that at which the salt changes color. The mass of the resin is not actually colored by the salt and even though the salt is present in such small amounts that the transparency of the resin is not substantially altered, it appears to be the color of the salt, probably because of internal reflection of light from the dispersed salt throughout the body of the resin. Also, the electrical and physical properties of the resins are not noticeably affected by the presence of the salts in such low concentrations.

Any of the well-known transparent potting resins may be used in this invention, such as polyesters, epoxys, urethanes, allylic resins and silicone resins. The color changing salt is mixed with the fluid or uncured resin and the potting operation is then performed in the conventional manner, that is, the resin is applied to the item to be potted by casting, dipping or molding and the resin is cured, generally by ageing at elevated or room temperatures. It will be recognized that some potting resin systems are made up of two components that are mixed together at the time of use. In such cases, the salt may be added to either component or to the freshly prepared mixture of both components.

Any of the well-known inorganic salts that change color at elevated temperatures and are inert to the potting resin may be used in this invention. Examples of such salts and the approximate temperature at which they change color include:

| Salt: | Temperature (° C.) |
|---|---|
| $(NH_4)_3H_6[Fe(MoO_4)]\cdot 7H_2O$ | 80 |
| $Co(C_2H_3O_2)_2$ | 85 |
| $Co_3(BO)_3$ | 85 |
| $[Co(CNS)_2(Pyr)_2]\cdot 10H_2O$ | 93 |
| $(CoSiF_6)$ | 99 |
| $Co_3(PO_4)_2$ | 112 |
| $Co(CHO_2)_2$ | 116 |
| Chromium ethylenediamine chloride | 120 |
| $[Cu(Pyr)_2](CNS)_2$ | 125 |
| Ammonium vanadate | 130 |
| $[Ni(Pyr)_4](CNS)_2$ | 135 |
| $[Cr(urea)]_6[Cr(CN)_6]$ | 140 |
| $[Cr(NH_3)_6]_4(P_2O_7)_3$ | 145 |
| $(NH_4)_3PO_4\cdot 12MoO_3$ | 150 |
| Aquopentaminecobaltic chloride | 170 |
| $[Co(NH_3)_5Cl]Cl_2$ | 190 |
| $[Co(NH_3)_6]PO_4$ | 200 |
| $[Ni(Pyr)_4](CNS)_2$ | 210 |
| $[Cu(Pyr)_2](CNS)_2$ | 220 |
| $[Cr(NH_3)_6]_4(P_2O_7)_3$ | 225 |
| $[Cr(NH_3)_5Cl]SiF_6$ | 250 |
| $[Cr(NH_3)_5Cl_2]O_4$ | 260 |
| Chromium ethylenediamine choride | 270 |
| $[Co(NH_3)_6]HP_2O_7$ | 280 |
| $[Co(NH_3)_6]_2(C_2O_4)_3$ | 335 |
| $NH_4MnP_2O_7$ | 400 |
| $CoNH_4PO_4\cdot H_2O$ | 500 |

Cobaltous phosphate (112° C.) and cobaltous acetate (85° C.) are especially preferred in potting thermal batteries.

The salts are preferably finely divided or powdered, for example, having a particle size smaller than 200 mesh, to provide a uniform coloration of the potting resin.

To illustrate this invention, 0.5 to 1.5% by weight of powdered cobaltous acetate was dispersed in a commercial epoxy potting resin, Helix Potting Compound P–430 supplied by the Carl H. Biggs Company, Baltimore, Md., and thermal batteries were encapsulated in the resin by conventional dipping methods and cured at room temperature for 12 hours. The potting resin was a transparent pink color and turned to a transparent brown when the thermal battery was fired. Similar results were obtained by dispersing .05–1.5% cobaltous acetate in a commercial silicone resin, RTV–20, obtained from General Electric. Similar results were obtained using cobaltous phosphate in place of the cobaltous acetate, the color change being from pink to purple or blue. The presence of the small amount of salt did not noticeably affect the physical or electrical characteristics of the potting resin.

According to the provisions of the patent statutes, I have explained the principle and mode of practice of my invention and have described what I now consider to represent its best embodiment. However, I desire to have it understood that, within the scope of the appended claim the invention may be practiced otherwise than as specifically described.

I claim:

1. A thermal battery having identifying markings encapsulated in a transparent potting composition consisting essentially of a transparent resin having dispersed therein between about 0.5 to 1.5% of a finely divided inorganic salt that changes color at a predetermined elevated temperature, said resin being curable at a temperature below said pretedermined temperature.

References Cited

UNITED STATES PATENTS

| | | | |
|---|---|---|---|
| 1,924,793 | 8/1933 | Laske. | |
| 3,078,182 | 2/1963 | Corne et al. | 252—408 XR |
| 3,189,485 | 6/1965 | Panzer | 136—83 XR |

FOREIGN PATENTS

| | | |
|---|---|---|
| 478,140 | 1/1938 | Great Britain. |

ALLEN B. CURTIS, *Primary Examiner.*

DONALD L. WALTON, *Assistant Examiner.*

U.S. Cl. X.R.

136—90, 182; 252—408; 264—272